(No Model.) 2 Sheets—Sheet 1.

F. R. YOUNG.
TRUING-UP INDICATOR.

No. 505,870. Patented Oct. 3, 1893.

Witnesses:
Fred. J. Dole.
George E. Mills.

Inventor.
Frank R. Young.
By his Attorney.
F. H. Richards (No Model.) 2 Sheets—Sheet 2.

F. R. YOUNG.
TRUING-UP INDICATOR.

No. 505,870. Patented Oct. 3, 1893.

Witnesses:
Fred J. Dole.
George E. Mills.

Inventor.
Frank R. Young.
By his Attorney.
F H Richards

UNITED STATES PATENT OFFICE.

FRANK R. YOUNG, OF HARTFORD, CONNECTICUT.

TRUING-UP INDICATOR.

SPECIFICATION forming part of Letters Patent No. 505,870, dated October 3, 1893.

Application filed January 12, 1893. Serial No. 458,129. (No model.)

*To all whom it may concern:*

Be it known that I, FRANK R. YOUNG, a citizen of the United States, residing at Hartford, in the county of Hartford and State of Connecticut, have invented certain new and useful Improvements in Truing-up Indicators, of which the following is a specification.

This invention relates to that class of indicators, or gages, which are used by tool-makers and machinists for indicating the eccentricity or degree of truth of pieces of work in the lathe; the object being to provide an improved truing-up indicator having a spring-actuated pointer, or indicator-arm, and adapted for use upon inside or outside work.

Figure 1:
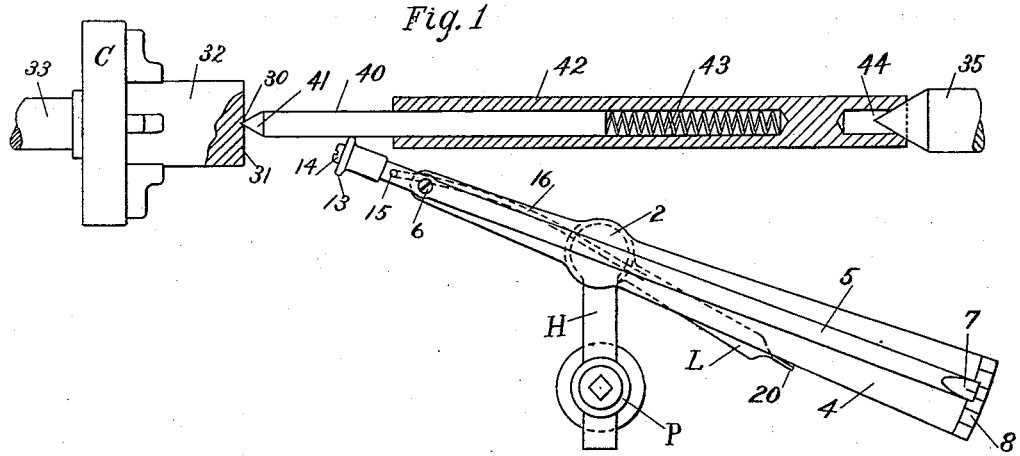
Figure 2:
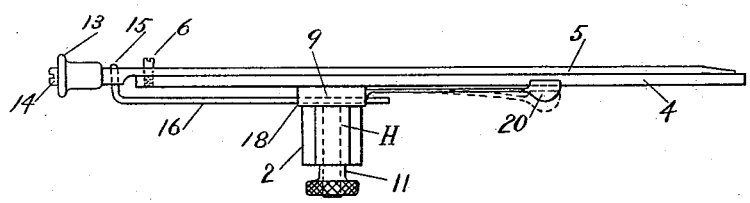
Figure 3:
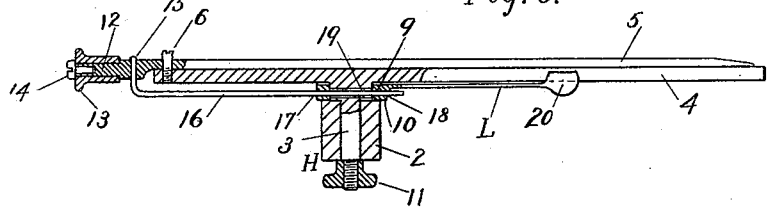
Figure 4:
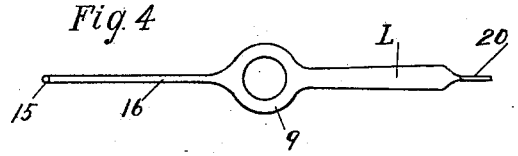
Figure 5:
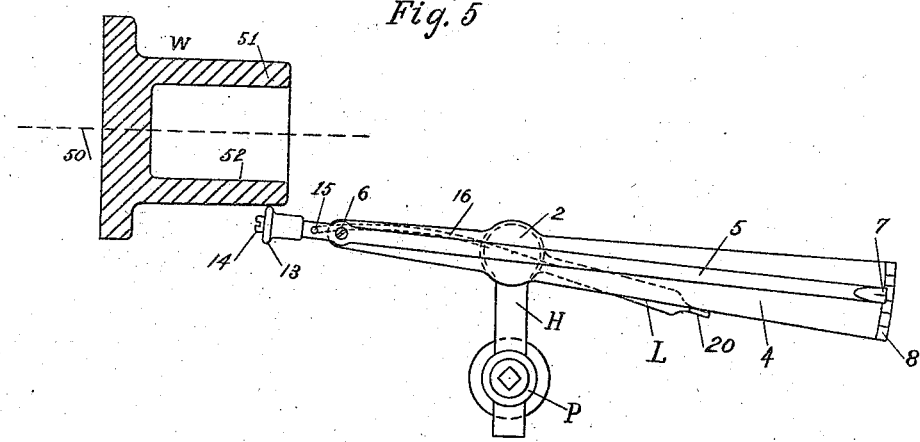
Figure 6:
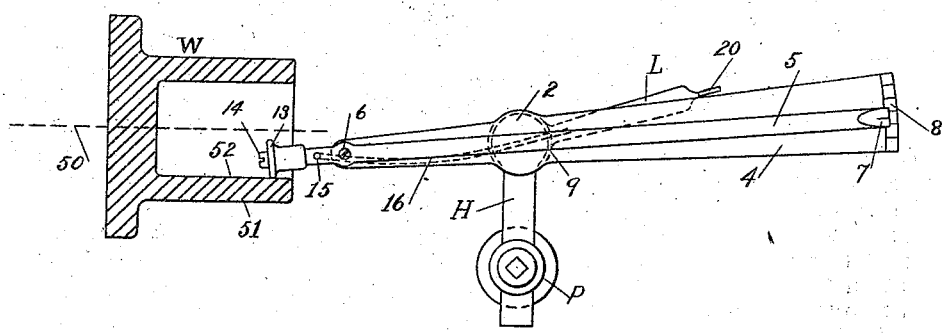

In the drawings accompanying and forming a part of this specification, Figure 1 is a plan view of an indicator, or gage, embodying my present invention, and illustrates the application of the instrument to one kind of work. Fig. 2 is a side elevation of the gage shown in Fig. 1. Fig. 3 is a sectional side elevation of the gage, this being in the same position as shown in Fig. 2. Fig. 4 illustrates a modification of the spring-lever. Fig. 5 is a plan view of the gage, and illustrates its application for indicating the outside of a piece of work. Fig. 6 is a view similar to Fig. 5, illustrating the application of the gage to "inside" work.

Similar characters designate like parts in all the figures.

The improved indicator herein shown and described is furnished with a holder, or shank, H, adapted to be held, after the manner of an ordinary lathe-tool, in the usual tool-post, P, as will be readily understood from the drawings without further description. One end of the shank H is shown formed into an eye, 2, which is bored vertically for receiving the stem 3 of the indicator-plate 4 whereon the indicator-pointer, or arm, 5, is pivotally supported by means of the pivot-screw, or stud, 6, fixed in one end of said plate 4.

As a means for setting and retaining the indicator in the several positions required, the stem 3 thereof should be fitted to turn freely but closely within said shank-eye 2, and has at the upper end thereof a shoulder at 10 (Fig. 3) bearing on the holder H; and is furnished on the lower end thereof with the clamping-nut 11, whereby the indicator may be clamped and unclamped as the use of the same may require. The projecting end of the indicator-pointer 5 is shown formed into a journal, 12, for carrying a roller, 13, which is shown held in place by a small screw, 14, as will be understood from the sectional view, Fig. 3. The opposite end of the pointer 5 is shown furnished with the indicator-line, or mark, 7, whereby the movement of the pointer may be read by means of the graduated scale at 8 on the plate 4, after the usual manner of reading indicator-scales.

At a point between the anti-friction roll 13 and the pivot 6, the pointer 5 is shown engaging with the end 15 of the pointer-actuating spring 16 whereby said pointer is normally thrown toward one (or the other) end of the graduated scale. For this purpose, said spring 16 is shown carried by a spring-controlling lever, L, to whose hub, or bearing, 9, said spring is attached. In some cases, (as shown, for instance, in Fig. 4,) the spring 16 may be an integral continuation of the lever L itself; or, it may be separate from said lever, as shown in the other figures of the drawings. In those figures said spring 16 is shown formed of a piece of wire whose end passes through, and closely fits in, holes at 17 and 18 in the lever-hub 9, and passes freely through the larger hole 19 which is formed transversely through the stem 3 of the indicator. By this means, when the indicator-plate is removed from the shank H, the lever is normally retained in place on the stem 3, and when the instrument is in use the lever is permitted to have the required swinging movement on the stem from the position shown in Fig. 5 to that shown in Fig. 6, and vice versa.

To disassemble the parts just described, when the indicator-plate is removed from the shank H, the end 15 of said spring 16 is forcibly drawn downward out of engagement with the indicator-pointer, after which the spring may be drawn out of the hub of the lever L, leaving this free to be removed from the stem.

As a means for locking the lever L in its respective positions shown in Figs. 5 and 6, said lever is shown made of small thickness and of a considerable width, so as to constitute a spring-lever, and is furnished at its outer end with the thumb-piece 20, whose upper edge engages the edges of the indicator-plate 4, as will be understood from the drawings in connection with the preceding description. To shift the lever L from one of its said positions to the other, the operator springs down the same, as indicated by dotted lines in Fig. 2, after which the lever is swung to its required position and allowed to spring upward into engagement with the plate 4.

In Figs. 5 and 6 the dotted line 50 represents the axis of revolution of a piece of work carried by a lathe spindle (not shown). It frequently happens, in practice, that such a piece of work has a longitudinal sectional form substantially such as represented by the piece W, which for a portion of its length is tubular and more or less nearly concentric with the aforesaid axis of revolution.

In Fig. 5 the indicator is shown applied to the outer surface, 51, of the piece W; while in Fig. 6 the indicator is shown applied to the inner surface, 52, thereof. When used upon "outside work" as illustrated in Fig. 5, the lever L is brought forward as there shown, to strain the spring 16 for holding the roll 13 against the outer surface, 51, of the piece of work. The entire indicator, when used for this class of work, being carried by the shank H, and this by the ordinary tool-post, P, of the lathe-carriage, (not shown,) the workman has only to move the tool-post forward or back to bring the working-stroke of the pointer 5 (due to the eccentricity of the surface to which this roll is applied) central with the graduated scale 8 for obtaining a reading of the movement of the indicator-line 7. This feature of the use of the indicator applies also to the arrangement thereof shown in Fig. 1, wherein the indicator is shown carried by the tool-post in the same manner.

In Fig. 1, I have shown means for, and the manner of, using an indicator for indicating the truth of a "center" formed at 30 in the face 31 of a piece, 32, held in the chuck C of a lathe, a portion of whose spindle is shown at 33 supporting said lathe-chuck. A centering-bar is shown set in place between said piece 32 and the usual dead-center, 35, of the lathe. Said centering-bar is composed of two parts, the rod 40, and the tube 42 within which said rod is fitted to slide closely but freely. The projecting end of the rod 40 is pointed at 41 to properly engage in the center at 30, and the inner end of said rod bears against the stiff spiral spring 43 which is placed within the bore of the bar 42. The opposite end (at the right hand in Fig. 1) of the bar 42 is shown bored and counter-sunk, at 44, so as to obtain therefor a much larger bearing-surface on the dead-center 35 than the point 41 of the bar 40 has upon the piece 32. By this means the centering-bar as a whole is normally non-rotative, being retained against rotation by the excess of friction on said dead-center.

In using this centering device, the point 41 is inserted into the center 30, and by means of the usual lathe-appliance the dead-center is brought against the bar 42 until the spring 43 is sufficiently compressed to hold the centering-bar firmly in place. The chuck C being now started rotating, if the center 30 be not exactly true, the rod 40 (which, it is to be understood, should be truly cylindrical, and concentric with the axis of the centering-bar) will partake of the eccentric movement of the center 30 and communicate that movement to the indicator when this is applied to the side of said bar 40 as illustrated in Fig. 1. For normally holding the roll 13 of the indicator against the bar 40, the spring-lever L is operated, similarly as described in connection with Fig. 5, for straining the spring to normally throw the projecting end of the indicator-pointer toward the centering-bar.

Having thus described my invention, I claim—

1. In an indicator of the class specified, the combination with a pointer-carrier, of the indicator-pointer pivotally supported on said carrier, a spring for actuating the pointer, and means for shifting the spring to work in opposite directions.

2. In an indicator of the class specified, the combination with means for carrying the indicator-pointer, of the indicator-pointer pivotally supported on its carrier, a lever and means for locking the same in successive positions, and a spring operatively connecting the lever and indicator-pointer, whereby the pointer may be spring-actuated for use in either direction.

3. In an indicator of the class specified, the combination with the plate having the stem for supporting the same, and with means for supporting said plate by said stem, of the indicator-pointer pivotally supported on the indicator-plate, the spring-actuating lever carried on said stem and adapted to be set in successive positions, and the spring 16 at one end engaging the indicator-pointer beyond the pivot-bearing thereof and at the other end carried by said lever and passing through said stem, whereby the indicator-pointer may be actuated in opposite directions, and whereby the indicator-parts are normally retained in place, substantially as set forth.

4. In an indicator of the class specified, the combination with the indicator-pointer and means for carrying the same, of the centering-bar comprising two bars longitudinally movable the one upon the other and having an intermediate spring, and pointed at one end for engaging the center of a piece of work, and constructed at the other end with a socket adapted to fit the dead-center of a lathe, substantially as shown and described.

FRANK R. YOUNG.

Witnesses:
THEODORE M. KALISH,
FRED. J. DOLE.